United States Patent
Andrew et al.

(10) Patent No.: US 12,469,104 B2
(45) Date of Patent: Nov. 11, 2025

(54) GRAIN-BASED MINEROLOGY SEGMENTATION SYSTEM AND METHOD

(71) Applicant: CARL ZEISS MICROSCOPY GMBH, Jena (DE)

(72) Inventors: Matthew Andrew, Livermore, CA (US); William Thompson, Torrance, CA (US); Joaquin Correa, Oakland, CA (US); Edward Hill, Cambridgeshire (GB); Benjamin Tordoff, Ulm (DE); Richard Moralee, Cambridgeshire (GB)

(73) Assignee: CARL ZEISS MICROSCOPY GMBH, Jena (DE)

(*) Notice: Subject to any disclaimer, the term of this patent is extended or adjusted under 35 U.S.C. 154(b) by 617 days.

(21) Appl. No.: 17/755,162

(22) PCT Filed: Oct. 23, 2020

(86) PCT No.: PCT/US2020/070691
§ 371 (c)(1),
(2) Date: Apr. 22, 2022

(87) PCT Pub. No.: WO2021/081559
PCT Pub. Date: Apr. 29, 2021

(65) Prior Publication Data
US 2022/0397697 A1 Dec. 15, 2022

Related U.S. Application Data (60) Provisional application No. 62/925,739, filed on Oct. 24, 2019.

(51) Int. Cl.
| | | |
|---|---|---|
| G06T 3/4046 | (2024.01) | |
| G01V 8/10 | (2006.01) | |
| G06F 18/214 | (2023.01) | |
| G06F 18/23 | (2023.01) | |
| G06V 10/82 | (2022.01) | |
| G06V 20/69 | (2022.01) | |
| G06V 30/24 | (2022.01) | |

(52) U.S. Cl.
CPC ............. *G06T 3/4046* (2013.01); *G01V 8/10* (2013.01); *G06F 18/214* (2023.01); *G06F 18/23* (2023.01);
(Continued)

(58) Field of Classification Search
CPC ......... G06T 3/4046; G06T 2207/10056; G06T 5/50; G06T 2207/10116;
(Continued)

(56) References Cited

U.S. PATENT DOCUMENTS 11,354,804 B1 * 6/2022 Behrooz .................. G06T 5/73
2009/0274385 A1   11/2009 Zhu et al.
(Continued)

FOREIGN PATENT DOCUMENTS

| CN | 107851316 A | 3/2018 |
|---|---|---|
| CN | 109142399 A | 1/2019 |
| GB | 2223842 A | 4/1990 |

OTHER PUBLICATIONS

International Search Report and Written Opinion for PCT Application No. PCT/US2020/070691, mailed on Jun. 1, 2021, 18 pages.
(Continued)

*Primary Examiner* — Nay A Maung
*Assistant Examiner* — Heath E. Wells
(74) *Attorney, Agent, or Firm* — Brake Hughes Bellermann LLP (57) ABSTRACT

A method of enhancing a resolution of an EDS image of a sample includes generating an EDS image of the sample, generating a non-EDS image of the sample generating, using a machine learning algorithm, an enhanced resolution EDS image of the sample based on the generated feature map and based on the first EDS image, where a resolution of the enhanced resolution EDS image is higher than a resolution of the first EDS image.

14 Claims, 8 Drawing Sheets

(52) U.S. Cl.
CPC ............ *G06V 10/82* (2022.01); *G06V 20/698* (2022.01); *G06V 30/2504* (2022.01)

(58) Field of Classification Search
CPC .......... G06T 2207/20081; G06T 2207/20084; G01V 8/10; G06F 18/214; G06F 18/23; G06F 18/24133; G06V 10/82; G06V 20/698; G06V 30/2504; G06N 3/045; G06N 3/08; G06N 20/00; G01N 2223/402; G01N 2223/418; G01N 2223/616; G01N 23/2252
USPC ......................................................... 382/109
See application file for complete search history.

(56) References Cited

U.S. PATENT DOCUMENTS

| | | | | |
|---|---|---|---|---|
| 2011/0295580 | A1* | 12/2011 | Sisk | G01N 33/24 703/10 |
| 2012/0275658 | A1* | 11/2012 | Hurley | G06T 7/11 382/109 |
| 2014/0001356 | A1* | 1/2014 | Buhot | G01N 23/2252 250/307 |
| 2018/0322327 | A1* | 11/2018 | Smith | G06V 20/698 |
| 2021/0090239 | A1* | 3/2021 | Pattnaik | G06T 7/174 |

OTHER PUBLICATIONS

Dash, et al., "Radial Basis Function Neural Netowrks: A Topical State-Of-The-Art Survey", Open Computer Science; May 2, 2016, pp. 33-63.

Wang, et al., "Grid Density Overlapping Hierarchical Algorithm for Clustering of Carbonate Reservoir Rock Types: A Case From Mishrif Formation of West QURNA-1 Oilfield, Irag", Journal of Petroleum Science and Engineering, Elsevier, Amsterdam, NL, vol. 182; Jun. 27, 2019.

Wang, et al., "Porous Structure Reconstruction Using Convolutional Neural Networks", Mathematical Geosciences, Springer Berlin Heidelberg, Berlin/Heidelberg; vol. 50, No. 7; May 18, 2018, pp. 781-799.

* cited by examiner

GRAIN-BASED MINEROLOGY SEGMENTATION SYSTEM AND METHOD

CROSS REFERENCE TO RELATED APPLICATION

This application is a 35 U.S.C. § 371 National Phase Entry Application from PCT/US2020/070691, filed Oct. 23, 2020, designating the U.S., and claims the benefit of U.S. Provisional Application No. 62/925,739, filed Oct. 24, 2019, the disclosures of which are incorporated herein by reference in their entireties.

FIELD

Embodiments automated analysis of images and, in particular, to grain-based minerology segmentation systems and methods.

BACKGROUND

Optical petrography and minerology can be performed on subsurface oil and gas reservoir samples and mine samples to provide information about, for example, mineralogy, porosity, permeability, grain size distribution, and mineral associations of samples taken from a well or bore hole. For mining operations, information provided by optical petrography and minerology is important, because it can reveal the morphological properties, particle size, and particle count of the material as it moves through mineral processing. This data can provide supporting evidence to make decisions at the well or mine site that could potentially increase the yield of the mineral of interest.

However optical petrography and minerology have often proved extremely challenging to automate, relying instead on skilled operating petrographers to perform "point counting" of images of material samples from the well or bore hole, where point counting entails a manual process in which random points in an image are selected and manually defined by a petrographer. This manual process is slow, laborious, and expensive, which reduces the value of the analysis, as it is much more challenging to scale over the entire length of a rock core (extracted from the subsurface). Such mineralogical analyses for analyzing the structure and chemical composition of geological samples can be performed using other analytical tools, such as quantitative mineralogy mapping, based on Energy Dispersive X-ray spectra (EDS), acquired from electron microscopes, or X-ray fluorescence (XRF) analyses, or generating backscattered electron (BSE) images or secondary electron (SE) images of the samples, but these tools are typically expensive and challenging to scale to a whole length rock core.

Particle separation (also referred to as particle segmentation) to identify particles of different material in a sample is an important step in mineral analysis because it can reveal the morphology profile of the particles that are being analyzed in addition to the overall particle count in the sample. However, for samples that are relatively complex, convoluted, and/or diverse, traditional histogram-based segmentation methods, such as those used in mineralogic mining, may not provide reliable results.

Currently, particle analysis based on histogram thresholding can be a suitable solution for relatively simple samples in which the particles in the image are well separated. However, particle analysis based on histogram thresholding may not be suitable for relatively complex samples in which particles touch each other on multiple points or in which particles are clumped together in clusters.

SUMMARY

In a general aspect, a device, a system, a non-transitory computer-readable medium (having stored thereon computer executable program code which can be executed on a computer system), and/or a method can perform a process that includes generating a light microscopy image of the sample, identifying individual grains in the light microscopy image using a first clustering algorithm to identify grain boundaries on a per-pixel basis, classifying the identified individual grains in the light microscopy image using a second clustering algorithm, and mapping the grain classifications to known mineral content.

Implementations can include one or more of the following features, alone or in any combination. For example, the process can further include identifying pore spaces in the sample based on output of a third clustering algorithm that analyzes the light microscopy image on a per-pixel basis, and identifying the individual grains in the image using the first clustering algorithm can be based, at least in part, on the identified pore spaces.

The pore spaces can be filled with a polymer material.

The light microscopy image can include a plurality of registered light microscopy images.

Classification of the identified individual grains by a second clustering algorithm can include classifying each grain based on aggregated statistics of a plurality of pixels corresponding to the grain.

In another general aspect, a method of enhancing a resolution of an EDS image of a sample includes generating an EDS image of the sample, generating a non-EDS image of the sample, generating, using a machine learning algorithm, an enhanced resolution EDS image of the sample based on the generated feature map and based on the first EDS image, wherein a resolution of the enhanced resolution EDS image is higher than a resolution of the first EDS image.

Implementations can include one or more of the following features, alone or in any combination.

For example, the non-EDS image can include a BSE image.

The non-EDS image can include an XRM image.
The non-EDS image can include an EM image.
The non-EDS image can include an SE image.

The process can further include normalizing the generated non-EDS image using feature scaling, and generating the explicit feature map of the sample from the non-EDS image can include generating the explicit feature map from the normalized non-EDS image.

Using the machine learning algorithm can include using a trained regressor to generate the enhanced resolution EDS image of the sample, wherein the regressor is trained using features from feature maps generated from non-EDS images of objects as samples and information from EDS images of objects as targets.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the example embodiments and wherein.

DETAILED DESCRIPTION

To address the deficiencies of the existing art, improved techniques are described herein for automatically separating and distinguishing touching objects (particles) in images using machine-learning-based filters and cascade classifiers. With these techniques, touching particles can be segmented and labeled as individual objects, making the analysis more reliable for those cases in which histogram-based thresholding methods are inadequate.

The application of machine learning techniques allows for more sophisticated image segmentation and classification and allows much more powerful object recognition, separation and classification algorithms than were previously possible.

In addition, when mineralogical samples are imaged using both BSE and EDS, the resolution of images obtained through BSE is generally higher than for images obtained through EDS, when the same acquisition time is used for both images. A consequence of the lower resolution in EDS images is a resulting lower sensitivity for mineral identification/classification and higher rates of mineral misclassification.

To address the low resolution of images obtained through EDS imaging techniques, machine learning techniques can be used to model images of samples obtained through other techniques (e.g., BSE imaging, SE imaging, X-Ray Microscopy (XRM), Focused Ion Beam Electron Microscopy (FIB-SEM), and Light Microscopy (EM)) and then to enhance the resolution of an EDS image based on the modelled images obtained through other techniques. In this manner, relatively high resolution EDS images can be obtained and used for mineral identification/classification using relatively short acquisition times.

Automatic Segmentation and Classification of Minerology Images

Techniques are described herein by which segmentation and classification of images of mineralogical samples can be obtained from light microscopy images of the samples through the use of machine learning techniques. The images can be obtained through various optical techniques, including single-mode and multimodal acquisition of images from rock samples. The rock samples can be thin sections or block face samples, with or without epoxy infiltration of voids in the rock samples.

Figure 1:
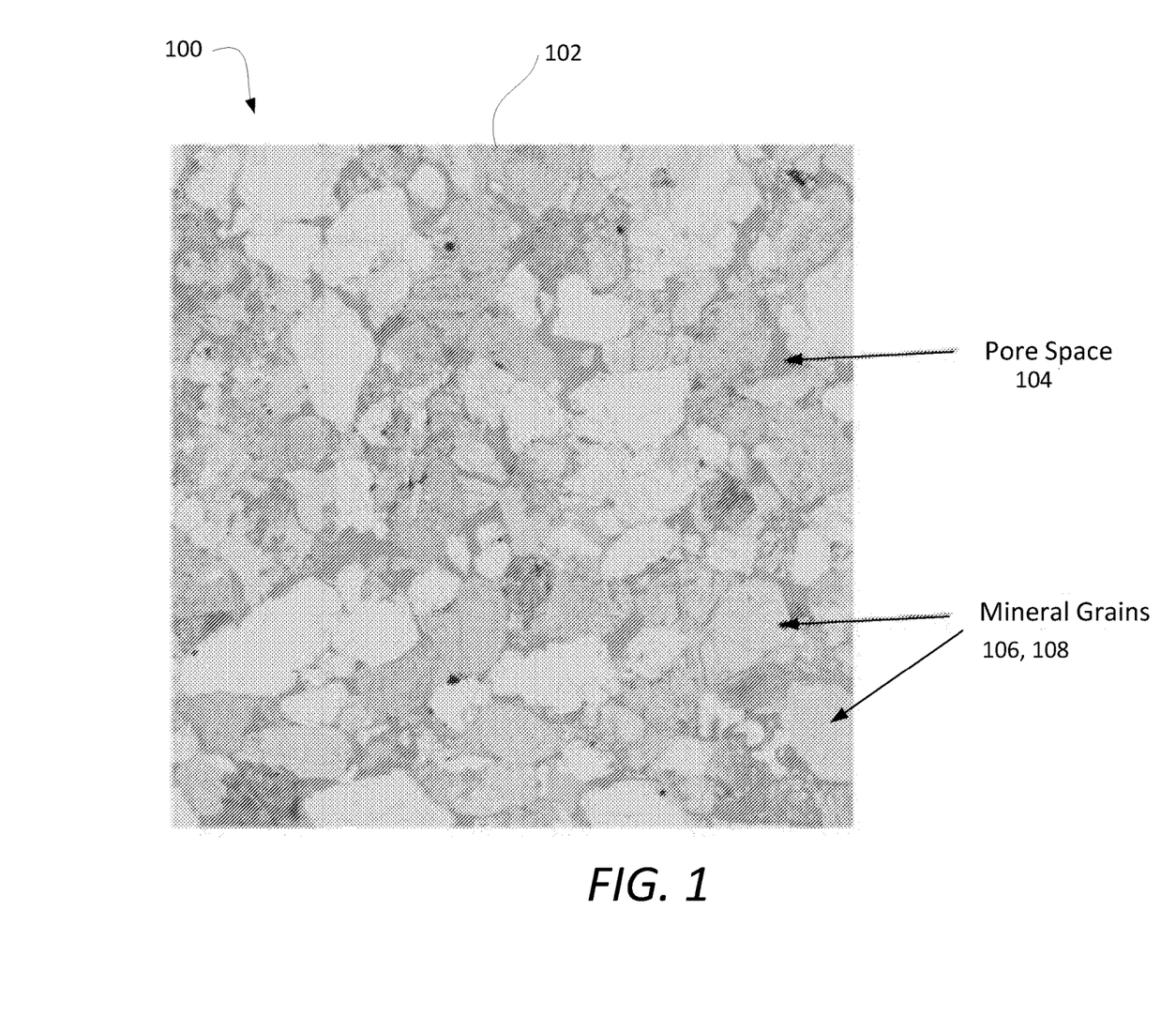
FIG. 1 is an example image of a granular rock sample that includes a light microscopy image of the sample.

FIG. 1 is an example image 100 of a granular rock sample 102 that includes a light microscopy image of the sample. The rock sample can include pores 104 between distinct grains 106, 108 of different material in the sample, and, in some implementations, the sample can be prepared prior to imaging by filling the pores with a fluid material (e.g., a polymer material, an epoxy material, etc.) that hardens and sets in the pores. For example, in FIG. 1, epoxy-filled pores of the sample 102 are represented by a first color (e.g., blue), while different separated grains 106, 108 are located between the epoxy material. As shown in FIG. 1, the density of the separated grains is high, and many grains touch other grains at their boundaries.

In some implementations, the image 100 of the sample can include not only a light microscopy image of the sample, but may also include two or more registered images, where the different registered images can be obtained through a number of different modalities (e.g., light microscopy, EDS, BSE, XRF, etc.). In some implementations, the image can be generated based on multiple images of the sample, where the multiple images are acquired with multiple illumination techniques from a single imaging modality. The different images may include, for example, multiple fluorescence images (e.g., obtained from different fluorescence wavelengths), or multiple polarization orientations etc.

The image 100 that includes the light microscopy image, and other such images of rock samples, can be used as inputs to an unsupervised clustering algorithm or a supervised clustering algorithm to determine automatically different grains in the image. When determining the different grains in the image, in addition to using information in the image corresponding to the grains themselves, the clustering algorithm also can make use of information from pore spaces between grains.

For example, the pore space of the rock can be uniquely identified pixel-by-pixel by the presence of a strong signal from the blue epoxy in the images. Because the optical signal from the epoxy in the pore space of the sample is relatively uniform compared with the signals from the many various minerals in the sample, the clustering algorithm can be used to identify the signal from the epoxy, thereby automatically identifying the pore spaces in the sample.

The pattern of the pore space that is identified in this manner can be considered as a "mask" that defines the presence of mineral grains in the openings of the mask. From this mask, individual grains in an image 100 can be separated into isolated objects. The individual grains can be automatically separated into a plurality of isolated objects by, for example, using a second round of machine learning segmentation (e.g., to identify grain boundary regions in a pixel-by-pixel manner), or by applying a separation algorithm, and labelling connected objects.

In some implementations, the applied separation algorithm can be based on ray-based object separation techniques or morphological watershed based techniques, but other grain separation algorithms can be used. For example, the separation algorithm can include so called "instance segmentation" machine learning techniques, such as mask RCNN, or object recognition techniques (such as YOLO (you only look once)), or machine learning techniques can be coupled with traditional image processing. By automatically separating the individual grains into a plurality of isolated objects in this manner, individual grains in the image of the sample can be identified, even when the grains are touching, so that relevant regional object statistics about the sample can be determined (e.g., the size, shape, and spatial associations of objects, which object class is next to which other object class), and also internal structures of an object can be determined (e.g., the pixel class distribution in the object, etc.).

Figure 2:
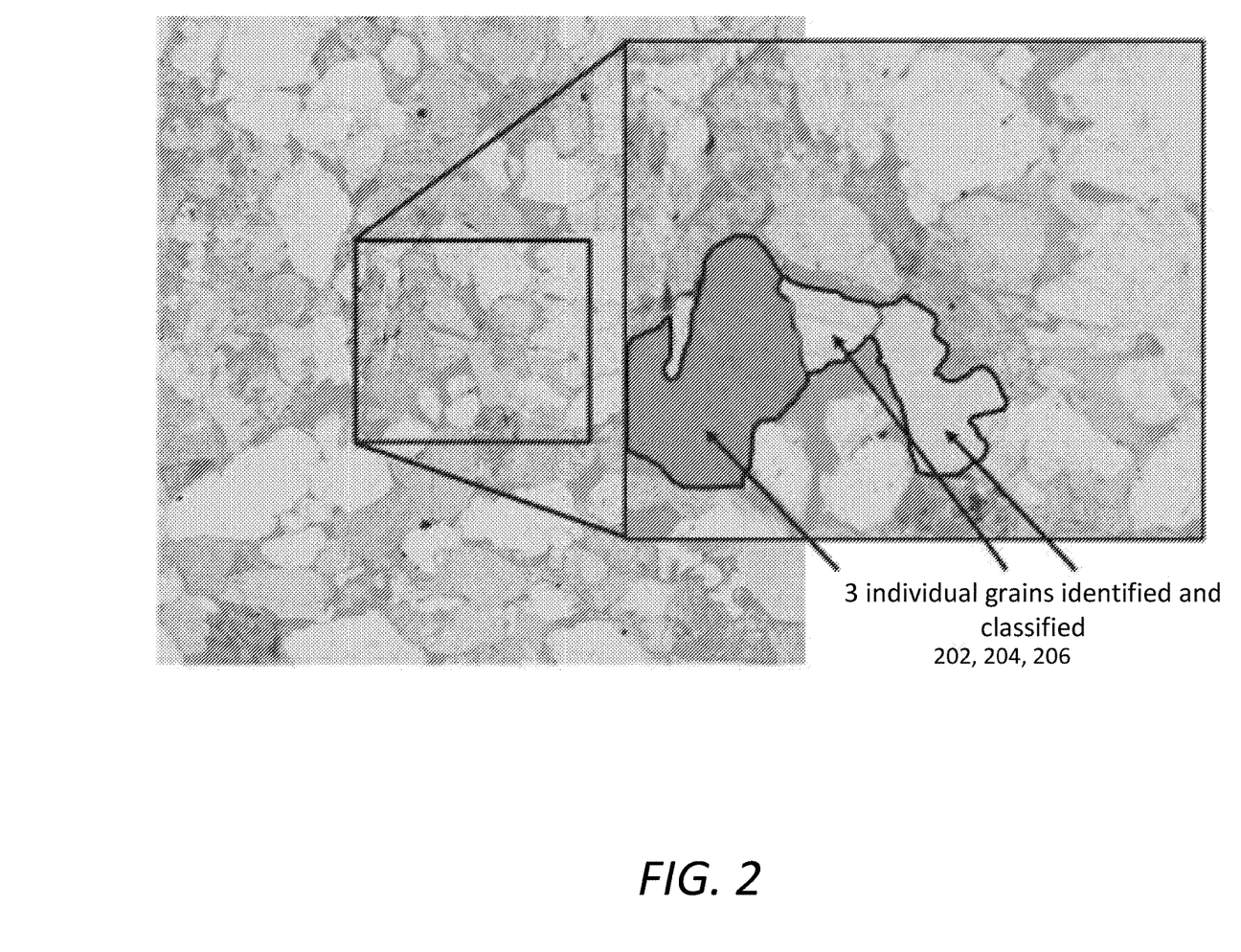
FIG. 2 illustrates how different grains in the image of FIG. 1 are classified, where the three grains outlined in black in the enlarged image at the right are classified according to their materials and/or properties.

Next, the population of the separated grains in the image 100 can be classified into different types using a clustering algorithm. FIG. 2 illustrates how different grains 202, 204, 206 in image 100 are classified, where the three grains outlined in black lines in the enlarged image are classified according to their materials and/or properties. The clustering algorithm can have greater discriminating power, and be much less susceptible to noise, than traditional pixel-by-pixel classification techniques, because the clustering algorithm can utilize the aggregate statistics of all of the pixels of an entire grain, rather than the local information available to an individual pixel. These statistics may include examining the distribution of pixel values within the region of the separated grain, the distribution of pixel values of filtered versions of the region (extracting, for example, local and non-local pixel or greyscale, local and non-local gradient or local and non-local textural information), or size/shape metrics for the pixel region (e.g. area, perimeter, major axis length, minor axis, inscribed radius, Feret diameter, or any number of other morphological measurements). In addition, the clustering algorithm is able to classify grains based on geometrical properties (e.g., size, shape, Feret diameter, fitted ellipsoid, sphericity, etc.), grayscale information (e.g., maximum, minimum, mean and median grayscale value, histograms, and texture filter information, etc.), thereby increasing the ability to correctly classify different grains.

The different types of grains that are output from the classification step performed by the clustering algorithm then can be assigned to specific mineral types or classes. In one implementation, the different types of grains can be manually mapped onto specific mineral classifications though manual training by an expert (e.g., a trained petrologist or a trained mineralogist). In some implementations, the different types of grains can be mapped onto specific mineral classifications though comparison to a standard database of mineral grain images. In some implementations, the different types of grains can be mapped onto specific mineral classifications though identification or quantitative comparison with an absolute mineral quantification technique, such as, for example, EDS-based mineral analysis, either locally (through correlated data) or by training on a library.

The mineral classifications of the grains in an image then can be analyzed for properties of interest to subsurface geoscientists, including grain size, size distributions, shape, exposed surface area, mineral associations, etc., which can then be correlated to critical functional properties such as reservoir permeability, diffusivity, or capillary pressure.

Figure 3:
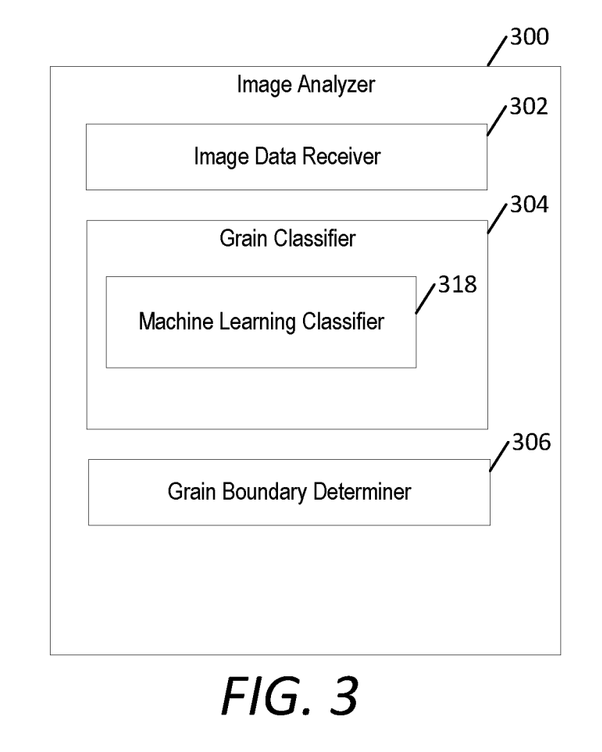
FIG. 3 shows a schematic diagram of an implementation of a minerology analyzer.

FIG. 3 shows a schematic diagram of an implementation of a minerology analyzer 300. The minerology analyzer 300 analyzes image data, such as the image data shown in FIGS. 1 and 2. In this example, the minerology analyzer 300 includes an image data receiver 302, a grain boundary determiner 306, and a grain classifier 304.

The image data receiver 302 receives image data. The image data may correspond to a sample, e.g., may include images of the sample. In some implementations, the image data receiver 302 receives the image data from a local data store. In some implementations, the image data receiver 302 receives the image data from another device via a network.

The grain boundary determiner 306 determines the boundaries between grains. For example, in some implementations, the grain boundary determiner 306 can analyze individual pixels of received image data for colors and brightness that are indicative of boundaries between grains. For example, when the pores of a sample that form boundaries between grains are infused with an epoxy material having a characteristic optical signature, analysis of image data by the grain boundary determiner 306 can identify the pixels that emit the characteristic optical signature and thereby determine grain boundaries in the image data.

In some implementations, the grain boundary determiner 306 can determine separate grains using image processing techniques, such as, for example, morphological techniques and/or ray casting techniques to analyze the content of an image. In some implementations, the grain boundary determiner 306 can automatically separate individual grains into a plurality of isolated objects by, for example, using a machine learning segmentation algorithm (e.g., to identify grain boundary regions in a pixel-by-pixel manner), or by applying a separation algorithm, and labelling connected objects. In some implementations, the separation algorithm can be based on ray-based object separation techniques or morphological watershed-based techniques, but other grain separation algorithms can be used. For example, the separation algorithm can include so called "instance segmentation" machine learning techniques, such as mask RCNN, or object recognition techniques (such as YOLO), or coupling machine learning with traditional image processing. By automatically separating the individual grains into a plurality of isolated objects in this manner, individual grains in the image of the sample can be identified, so that relevant regional object statistics about the sample can be determined (e.g., size, shape, spatial associations, which object class is next to which other object class), and also internal structures of an object can be determined (e.g., the pixel class distribution in the object, etc.).

The grain classifier 304 classifies separated grains in the image data and includes a machine learning classifier 318. The machine learning classifier 318 classifies image data from a sample. For example, the machine learning classifier 318 may classify image data based on labeled training data, such as training data that is labeled by a human expert. Training data (classified grains) may also be provided by other analytical tools, such as EDS or Electron Backscatter Diffraction (EBSD) based mineral/grain classification (on an electron microscope). Some implementations can use a classifier trained on labeled training data to classify the image data. The training data may include training samples corresponding to grains that are labeled. In some implementations, specific loci are extracted from the training samples prior to training the classifier and then only those specific loci are used to train the classifier.

The machine learning classifier 318 may be trained by a machine learning module (not shown) of the minerology analyzer 300, and/or the machine learning classifier 318 may be trained by, and retrieved from, another computing device via a network. The machine learning classifier 318 may have one of various configurations. For example, the machine learning classifier 318 may include a Naïve Bayesian model, a random tree model, a random forest model, a neural network model (e.g., a R-CNN model, a Mask CNN model, a UNET model), a logistic regression model, or a support vector machine model. The support vector machine model may be trained using, for example, sequential minimal optimization. The instance segmentation model may operate as a single classification model, or may be linked to subsequent image analysis steps (e.g., a UNET model could be used to identify grain regions and boundary regions, and then a morphological tool, ray-casting or simple labelling could be used to identify individual grains. The statistics of the identified grains can be used to assign the grains to specific classes.

In some implementations, the machine learning classifier 318 may classify a sample (e.g., choose labels for different grains in an image of the sample) for a new sample based on that sample's similarities with characteristics of training samples. In other words, the machine learning classifier 318 may classify an input based on similarity with the learned characteristics of each class (label). In some implementations, the machine learning classifier 318 may provide a probability for each class, e.g., a number indicating the likelihood that the sample should be classified in the class.

EDS Resolution Enhancement Based on Multimodal Imaging

Although the generation of an EDS image of a sample is generally of lower resolution and/or more time consuming than the generation of an image of the sample using other techniques, such as, for example, BSE imaging, SE imaging, XRF imaging, FIB-SEM imaging, and EM imaging, the information obtained through the different modalities is different and can provide different value to the user. Although higher resolution EDS images are possible using longer acquisition times, the cost of increased acquisition time may make such higher resolution EDS less desirable in a highly demanding production environment where high turnarounds are expected and short time-to-knowledge is critical.

Therefore, many systems are designed to collect data from different modalities (e.g., EDS and BSE) at different resolutions to meet time acquisition requirements with the caveat of trading low data quality for speed. Generally, the limitations of low resolution EDS in such systems include reduced sensitivity for mineral detection and higher rates of mineral misclassification. The former is due to small contributions to the signal of a given mineral in a particular scanned window where other minerals are more abundant, and the latter is due to mixed signal effects between multiple minerals, for example, at boundaries between two minerals.

To address these issues, techniques are described herein by which the resolution of EDS image can be enhanced based on machine learning and data fusion techniques in which details of an EDS image of a sample are modeled based on an image of the sample obtained from the sample using other imaging techniques, such as, for example, BSE, SE, XRM, FIB-SEM, EM. This can improve the resolution of the final EDS image without significantly increasing the acquisition time of the EDS image.

Figure 4:
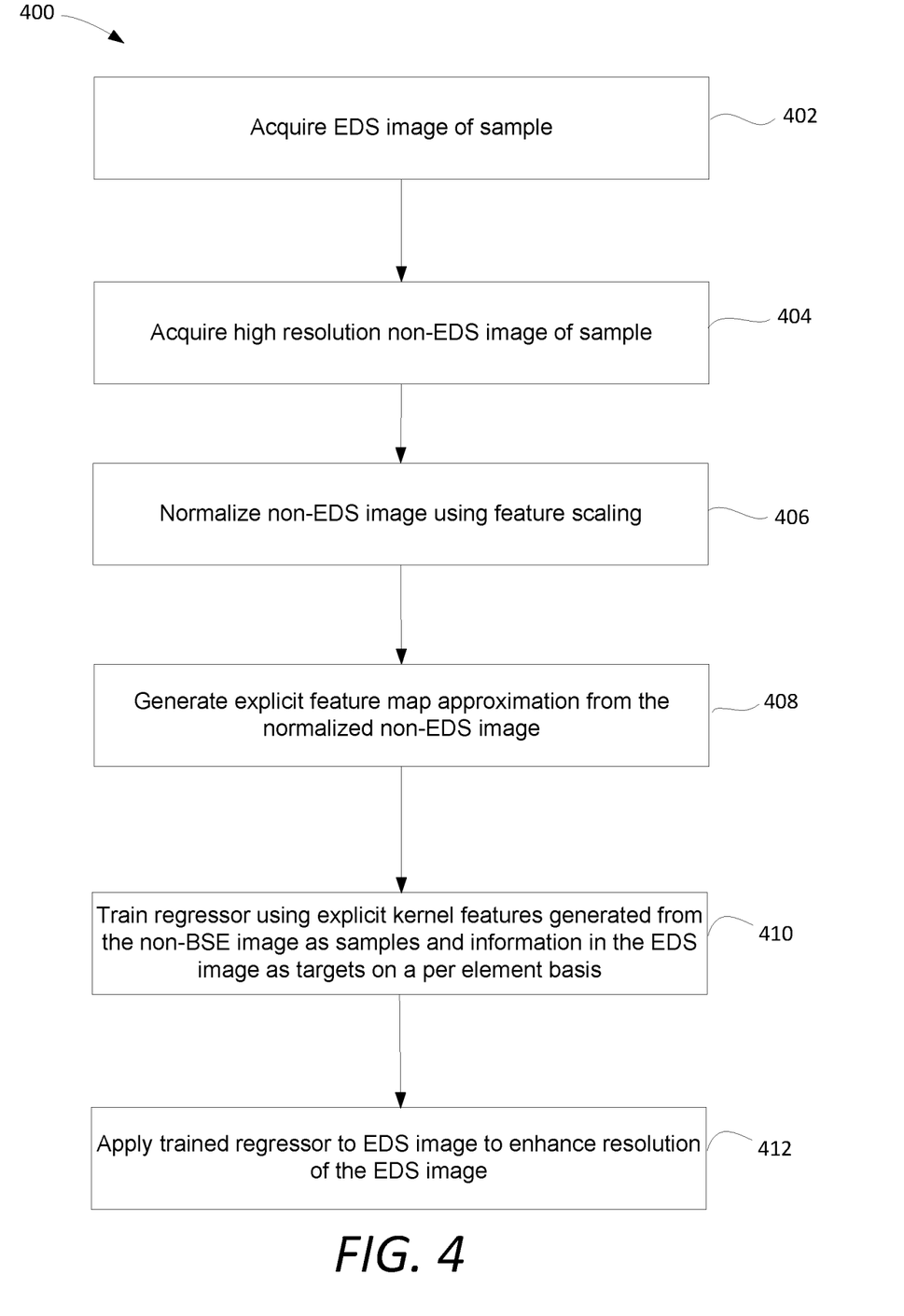
FIG. 4 is a flow chart of an example process for enhancing the resolution of an EDS image of a sample based on a BSE image of the same sample.

For example, FIG. 4 is a flow chart of an example process 400 for enhancing the resolution of an EDS image of a sample based on a BSE image of the same sample. In the process 400, an EDS image of a sample can be acquired (402), and a non-EDS image (e.g., a BSE image, an SE image, an XRM image, a FIB-SEM image, an EM image) of the sample can be acquired (404). The non-EDS image can be normalized using feature scaling (406). An explicit feature map approximation can be generated from the normalized non-EDS image (408). For example, an $N^{th}$ order feature map can be generated. In some implementations, N can be greater than or equal to 100. In some implementations, the feature map can be generated radial basis function kernel features of a Monte Carlo approximation of a Fourier transform of the normalized non-EDS image (410). A regressor can be trained using explicit kernel features generated from non-EDS images of objects as samples and information in EDS images of the objects as targets on a per element basis (412). In an implementation, the regressor can use nearest neighbor regression in cases where the data labels are continuous variables, rather than discrete variables. In an implementation, the label assigned to a query point can be computed based on the mean of the labels of its nearest neighbors. Then, the trained regressor can be applied to enhance the resolution of the low-resolution EDS images to generate enhanced resolution images from the low-resolution EDS images. In some implementations, an enhanced resolution EDS image of a sample can be analyzed to determine a chemical composition of the imaged sample.

Figure 5:
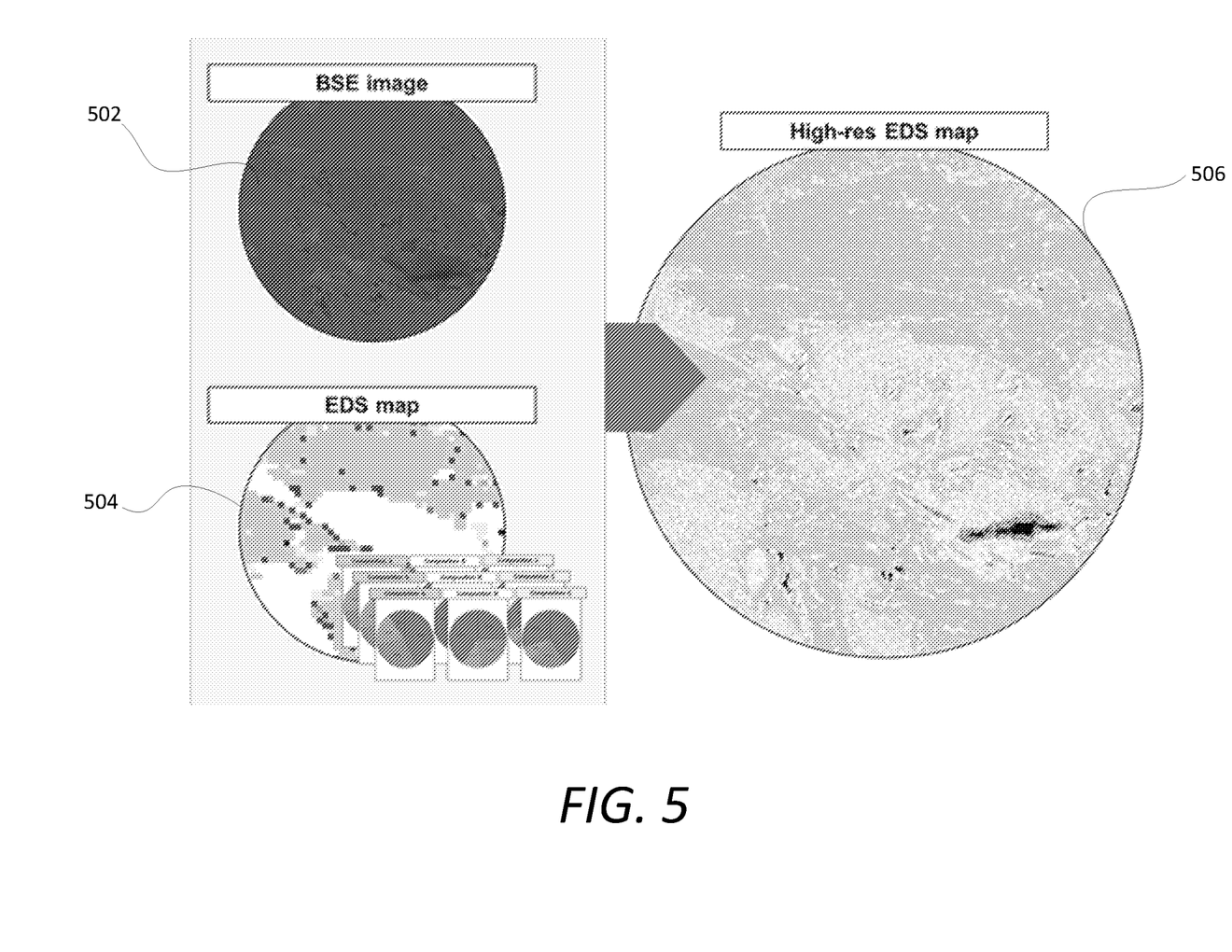
FIG. 5 illustrates an example of the process in which a relatively high resolution BSE image and a relatively low resolution image of a sample are obtained, and a feature map approximation is generated from the BSE image, such that a high resolution EDS image can be generated based on the mapping.

FIG. 5 illustrates an example of the process 400, in which a relatively high resolution BSE image 502 and a relatively low resolution EDS image 504 of a sample are obtained, and a feature map approximation is generated from the BSE image, such that a high resolution EDS image 506 can be generated based on the mapping.

Figure 6A:
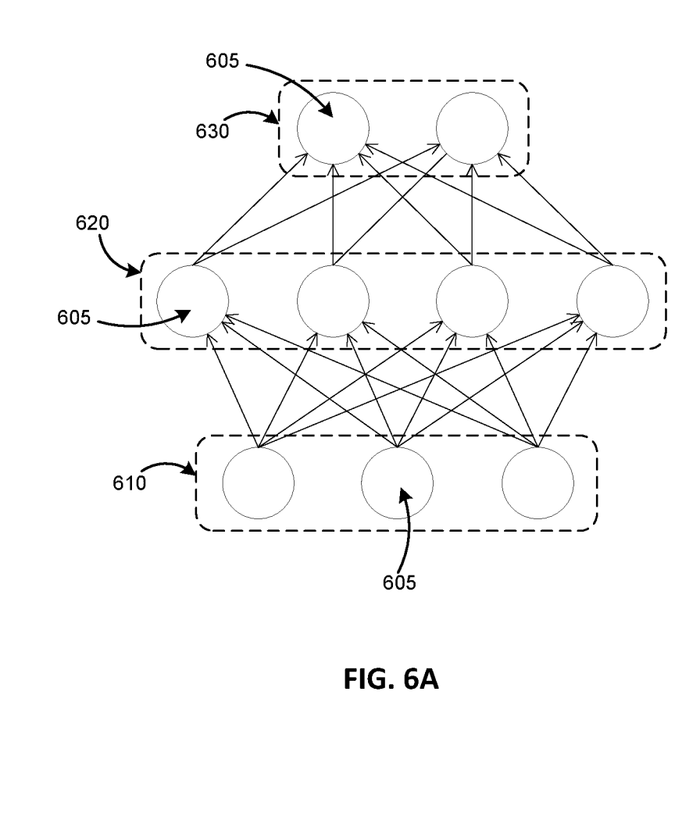
FIG. 6A illustrates layers in a convolutional neural network (CNN) with no sparsity constraints.
Figure 6B:
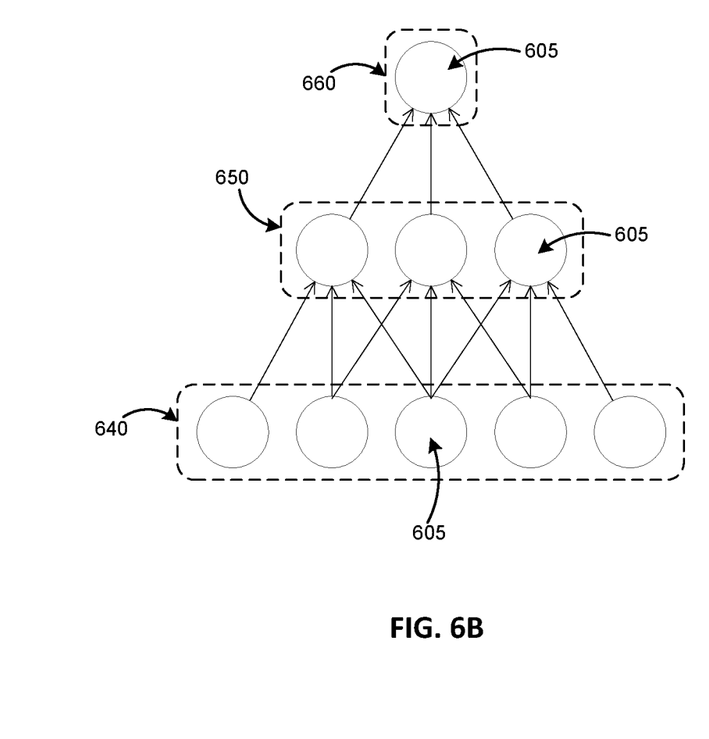
FIG. 6B illustrates layers in a convolutional neural network (CNN) with sparsity constraints.

Machine learning processes involving convolutional neural networks (CNNs) can be used to enhance a resolution of an EDS image of a sample based on a BSE image of the same sample. FIG. 6A illustrates layers in a convolutional neural network (CNN) with no sparsity constraints. FIG. 6B illustrates layers in a convolutional neural network (CNN) with sparsity constraints. With reference to FIGS. 6A and 6B, various configurations of neural networks for use in at least one example implementation will be described. An example layered neural network is shown in FIG. 6A. The layered neural network includes three layers 610, 620, 630. Each layer 610, 620, 630 can be formed of a plurality of neurons 605. In this implementation, no sparsity constraints have been applied. Therefore, all neurons 605 in each layer 610, 620, 630 are networked to all neurons 605 in any neighboring layers 610, 620, 630.

The example neural network shown in FIG. 6A is not computationally complex due to the small number of neurons 605 and layers. However, the arrangement of the neural network shown in FIG. 6A may not scale up to larger sizes of networks due to the density of connections (e.g., the connections between neurons/layers). In other words, the computational complexity can be too great as the size of the network scales and scales in a non-linear fashion. Therefore, it can be too computationally complex for all neurons 605 in each layer 610, 620, 630 to be networked to all neurons 605 in the one or more neighboring layers 610, 620, 630 if neural networks need to be scaled up to work on inputs with a large number of dimensions.

An initial sparsity condition can be used to lower the computational complexity of the neural network. For example, if a neural network is functioning as an optimization process, the neural network approach can work with high dimensional data by limiting the number of connection between neurons and/or layers. An example of a neural network with sparsity constraints is shown in FIG. 6B. The neural network shown in FIG. 6B is arranged so that each neuron 605 is connected only to a small number of neurons 605 in the neighboring layers 640, 650, 660. This can form a neural network that is not fully connected, and which can scale to function with higher dimensional data. The smaller number of connections in comparison with a fully networked neural network allows for the number of connections between neurons to scale in a substantially linear fashion.

In some implementations, convolutional neural networks that are not fully connected and have less complexity than fully connected neural networks can be used. Convolutional neural networks can also make use of pooling or max-pooling to reduce the dimensionality (and hence complexity) of the data that flows through the neural network. Other approaches to reduce the computational complexity of convolutional neural networks can be used.

Figure 7:
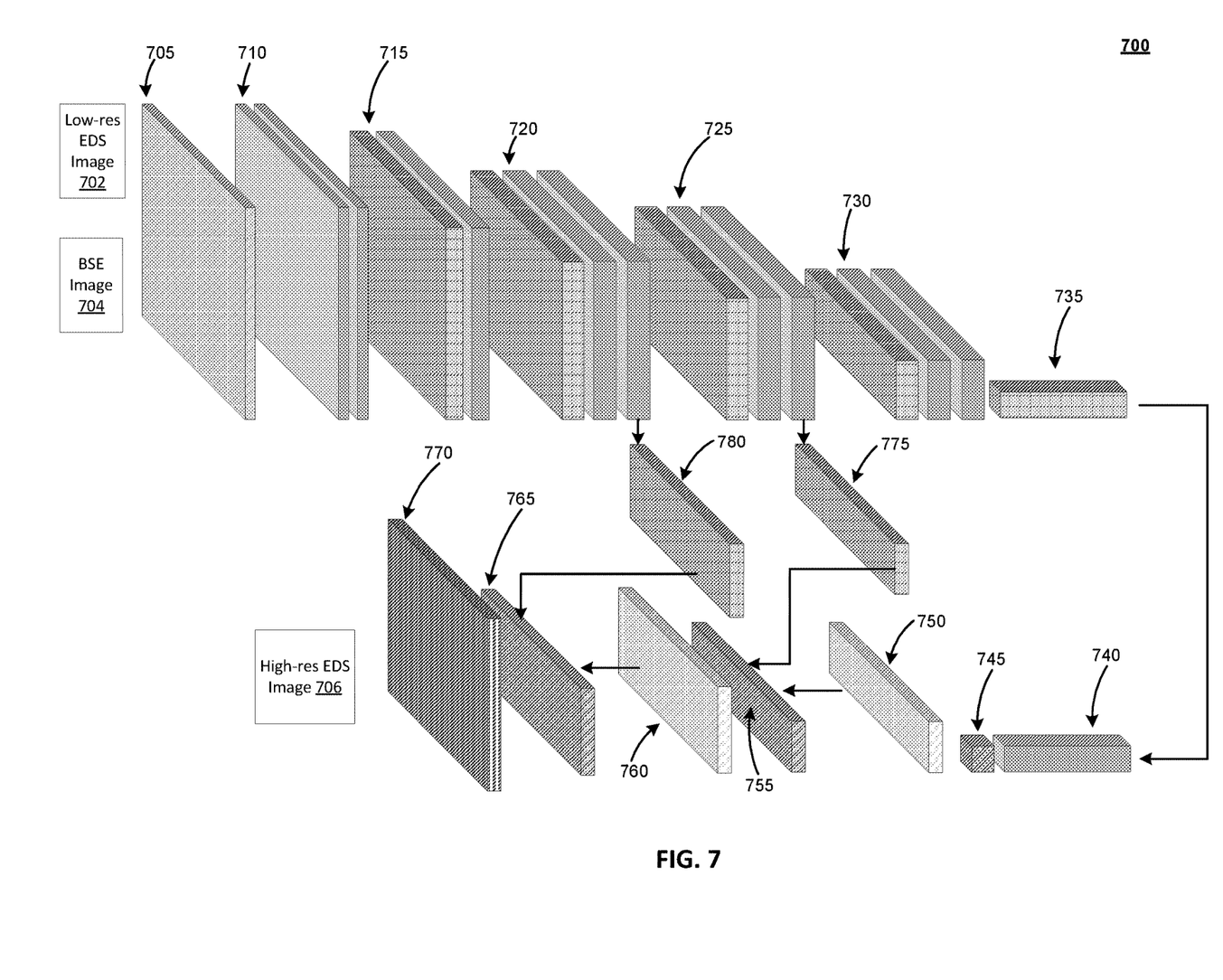
FIG. 7 illustrates a block diagram of a machine learning model according to an example embodiment.

FIG. 7 illustrates a block diagram of a machine learning model according to an example embodiment. A ML model 700 can be configured to implement pixel-level image resolution enhancement. The ML model 700 can include, for example, a regression-type, a classification-type convolutional neural network (CNN). Pixel-level image enhancement can generate an enhanced EDS image 706 from at least a low-resolution EDS image 702 and a BSE image 704 having complementary characteristics and information corresponding to the same sample.

A convolution layer or convolution can be configured to extract features from an image. Features can be based on color, frequency domain, edge detectors, and/or the like. A convolution can have a filter (sometimes called a kernel) and a stride. For example, a filter can be a 1×1 filter (or 1×1×n for a transformation to n output channels, a 1×1 filter is sometimes called a pointwise convolution) with a stride of 1 which results in an output of a cell generated based on a combination (e.g., addition, subtraction, multiplication, and/or the like) of the features of the cells of each channel at a position of the M×M grid. In other words, a feature map having more than one depth or channels is combined into a feature map having a single depth or channel. A filter can be a 3×3 filter with a stride of 1, which results in an output with fewer cells each channel of the M×M grid or feature map.

The output can have the same depth or number of channels (e.g., a 3×3×n filter, where n=depth or number of channels, sometimes called a depthwise filter) or a reduced depth or number of channels (e.g., a 3×3×k filter, where k<depth or number of channels). Each channel, depth or feature map can have an associated filter. Each associated filter can be configured to emphasize different aspects of a channel. In other words, different features can be extracted from each channel based on the filter (sometimes called a depthwise separable filter). Other filters are within the scope of this disclosure.

Another type of convolution can include a combination of two or more convolutions. For example, a convolution can include a depthwise and pointwise separable convolution. This can include, for example, a convolution in two steps. The first step can include a depthwise convolution (e.g., a 3×3 convolution). The second step can include a pointwise convolution (e.g., a 1×1 convolution). The depthwise and pointwise convolution can include a separable convolution in that a different filter (e.g., filters to extract different features) can be used for each channel or at each depth of a feature map. In an example implementation, the pointwise convolution can transform the feature map to include c channels based on the filter. For example, an 8×8×3 feature map (or image) can be transformed to an 8×8×256 feature map (or image) based on the filter. In some implementation more than one filter can be used to transform the feature map (or image) to an M×M×c feature map (or image).

A convolution can be linear. A linear convolution describes the output, in terms of the input, as being linear time-invariant (LTI). Convolutions can also include a rectified linear unit (ReLU). A ReLU is an activation function that rectifies the LTI output of a convolution and limits the rectified output to a maximum. A ReLU can be used to accelerate convergence (e.g., more efficient computation).

In an example implementation, the first type of convolution can include a 1×1 convolution and the second type of convolution can include a depthwise and pointwise separable convolution. Each of the plurality of convolution layers 720, 735, 740, 745, 750, 755, 760 can have a plurality of cells and at least one bounding box per cell. Convolution layers 715, 720, 725 and add layer 730 can be used to transform the image 702, 704 to a feature map that is equivalent in size to a feature map of the Conv_3 layer of the VGG-16 standard. In other words, convolution layers 715, 720, 725 and add layer 730 can transform the image 702, 704 to a 38×38×512 feature map.

In an example implementation, the ML model 700 CNN (e.g., regression-type CNN) can include a plurality of convolutional layers 705, 710, 715, 720, 725, 730, 735, 740, 745, 750, 755, 760, 765, and 770. The plurality of convolutional layers 705, 710, 715, 720, 725, 730, 735, 740, 745, 750, 755, 760, 765, and 770 can each correspond to at least one type of convolution layer. As shown in FIG. 7, the convolutional layer 705 can include a first convolution type, the convolutional layer 710 can include a second convolution type, the convolutional layers 715, 720, 725, 730 can include the second convolution type and a third convolution type, the convolutional layer 735 can include the third convolution type, the convolutional layer 740 can include a fourth convolution type, the convolutional layers 745, 755, 765 can include a fifth convolution type, the convolutional layers 750, 760 can include a sixth convolution type, and the convolutional layer 770 can include a seventh convolution type.

Each convolutional layer can generate many alternate convolutions, so the weight matrix is a tensor of x*y*n, where x*y is the size of a sliding window (typically x=y) and n is the number of convolutions. The low resolution EDS image 702 and the BSE image 704 can be input to the CNN. In the first convolution type, the image 702 and the image 704 can transform the image using a 224*224*3 weight matrix. The convolutional layer 710 can transform the resultant feature map using a 224*224*64 weight matrix. The convolutional layer 715 can transform the resultant feature map using a 112*112*128 weight matrix. The convolutional layer 720 can transform the resultant feature map using a 56*56*256 weight matrix. The convolutional layer 725 can transform the resultant feature map using a 28*28*512 weight matrix. The convolutional layer 730 can transform the resultant feature map using a 14*14*512 weight matrix, and the convolutional layer 735 can transform the resultant feature map using a 7*7*4096 weight matrix.

The next part of the ML model 700 can be configured to transform the feature map output from convolution layer 735 to an image with a size that is equivalent to the input image (e.g., image 702 or image 704). Convolution layer 740 receives a feature map from convolution layer 735 and transforms the feature map using a 7*7*4096 weight matrix. The convolutional layer 745 can transform the resultant feature map using a 7*7*classes weight matrix (where classes is a number of in the feature map). The convolutional layer 750 can transform the resultant feature map using a 14*14*classes weight matrix, the convolutional layer 755 can transform the resultant feature map together with the feature map output from convolution layer 725 (convolution layer 775) using a 14*14*classes weight matrix. The convolutional layer 760 can transform the resultant feature map using a 28*28*classes weight matrix. The convolutional layer 765 can transform the resultant feature map together with the feature map output from convolution layer 720 (convolution layer 780) using a 28*28*classes weight matrix. The convolutional layer 770 can transform the resultant feature map using a 224*224*classes weight matrix. The resultant feature map can include the output image (e.g., fused image 706).

Once a model (e.g., ML model 700) architecture has been designed (and/or in operation), the model should be trained (sometimes referred to as developing the model). The model can be trained using a plurality of images of samples obtained through B SE and EDS imaging.

Image enhancement using machine learning (ML) models can include two phases. In a first phase, enhancement algorithms can be trained using supervised learning. In a second phase, the enhancement algorithm can be deployed. As discussed above, example implementations can use a convolutional neural network (CNN) based enhancement algorithm. In the first phase the neural network can be trained, for example, two images can be input with first and second characteristics to the network. The output of the network can be compared with a ground truth image that has the most desirable characteristics we want the network to reproduce. An evaluation metric can be used to quantify the difference between the output and the ground truth images. This difference is used to update parameters of the network which represents the training process. This process is repeated iteratively using a plurality of image examples until the difference between the output and the ground truth image is within a desirable margin and that concludes the training process.

Figure 8:
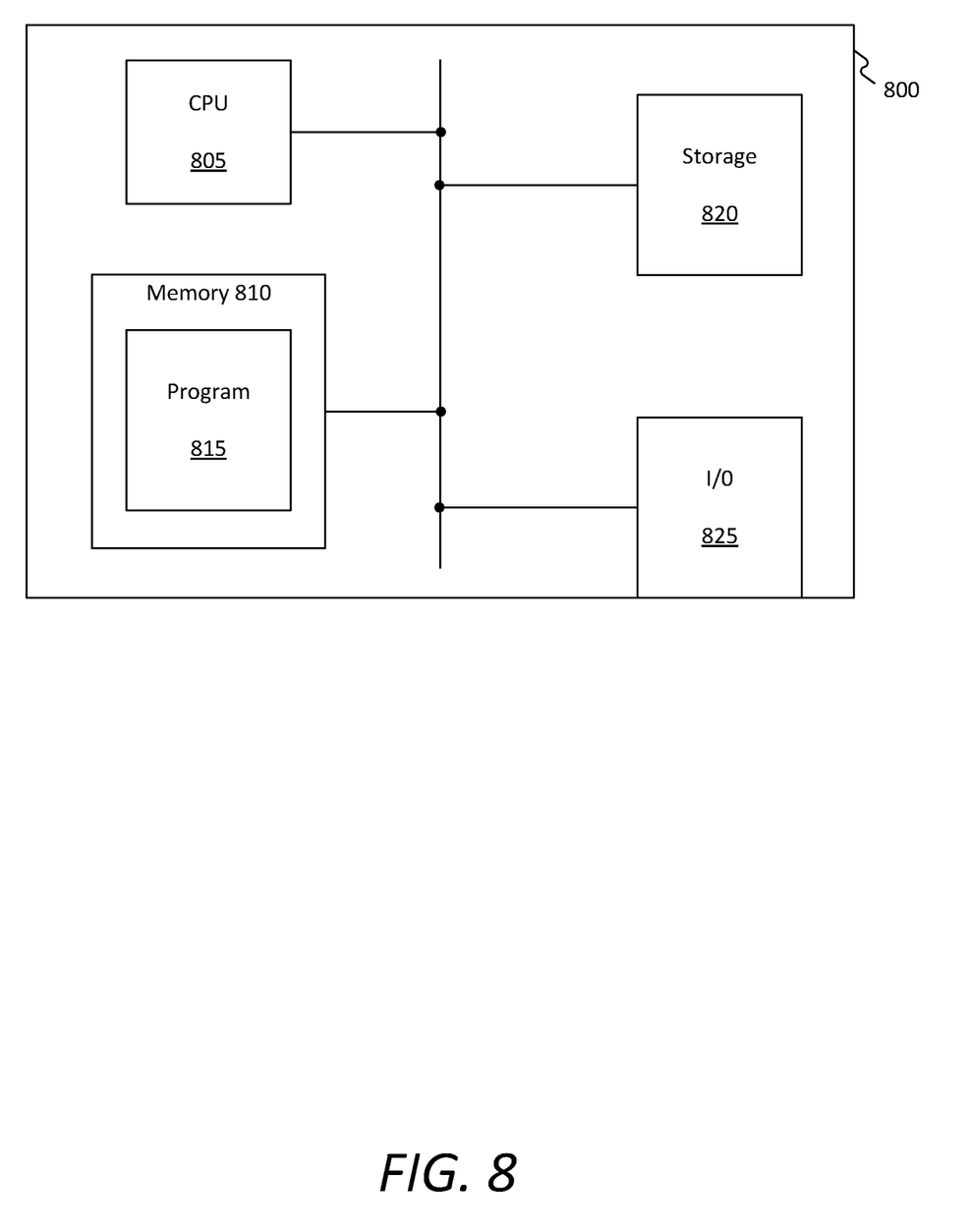
FIG. 8 illustrates an example of a computing system that can implement techniques described here.

FIG. 8 illustrates an example of a computing system that can be used to implement the techniques described here. The system 800 is intended to represent various forms of digital computers, such as laptops, desktops, workstations, personal digital assistants, servers, blade servers, mainframes, mobile devices, and other appropriate computers.

The components and arrangement of the system 800 may be varied. The system 800 includes a number of components, such as a processor (e.g., a CPU) 805, a memory 810, an input/output (I/O) device(s) 825, and a nonvolatile storage device 820. The system 800 can be implemented in various ways. For example, an integrated platform (such as a workstation, personal computer, laptop, etc.) may comprise the processor 805, the memory 810, the nonvolatile storage 820, and I/O devices 825. In such a configuration, components 805, 810, 820, and 825 may connect through a local bus interface and access a database, via an external connection. This connection may be implemented through a direct communication link, a local area network (LAN), a wide area network (WAN) and/or other suitable connections. The system 800 may be standalone or it may be part of a subsystem, which may, in turn, be part of a larger system.

The processor 805 may be one or more processing devices, such as a microprocessor. The memory 810 may be one or more storage devices configured to store information used by processor 805 to perform certain functions related to implementations of the present invention. The storage 820 may be a volatile or non-volatile, magnetic, semiconductor, tape, optical, removable, nonremovable, or other type of storage device or computer-readable medium. In one implementation, the memory 810 includes one or more executable instructions 815 loaded from storage 820 or elsewhere that, when executed by the processor 805, perform various procedures, operations, or processes consistent with the processes described here. For example, memory 810 may include programs corresponding to components of the image analyzer 300, such as the image data receiver 302, the grain boundary determiner 306, and the grain classifier 304. and that execute instructions to perform one or more of the processes described herein. The memory 810 may also include other programs that perform other functions and processes, such as programs that provide communication support, Internet access, etc.

Methods, systems, and articles of manufacture described here are not limited to separate programs or computers configured to perform dedicated tasks. For example, the memory 810 may be configured with executable instructions 815 that performs several functions when executed by processor 805. Moreover, the processor 805 may execute one or more programs located remotely from system 800. For example, the system 800 may access one or more remote programs that, when executed, perform functions related to implementations described here.

The memory 810 may be also be configured with an operating system (not shown) that performs several functions when executed by processor 805. The choice of operating system, and even to the use of an operating system, is not critical.

I/O device(s) 825 may include one or more input/output devices that allow data to be received and/or transmitted by system 800. For example, the I/O device 825 may include one or more input devices, such as a keyboard, touch screen, mouse, etc., that enable data to be input from a user, such as sequencing and analysis requests, adjustment of threshold and contamination conditions, etc. Further, the I/O device 825 may include one or more output devices, such as a display screen, CRT monitor, LCD monitor, plasma display, printer, speaker devices, and the like, that enable data to be output or presented to a user. The I/O device 825 may also include one or more digital and/or analog communication input/output devices that allow computing system 800 to communicate with other machines and devices, such as other continuous remote servers that process sample profile queries. The system 800 may input data from external machines and devices and output data to external machines and devices via I/O device 825. The configuration and number of input and/or output devices incorporated in the I/O device 825 are not critical.

The systems and techniques described here can be implemented in a computing system that includes a back-end component (e.g., as a data server), or that includes a middleware component (e.g., an application server), or that includes a front-end component (e.g., a client computer having a graphical user interface or a Web browser through which a user can interact with an implementation of the systems and techniques described here), or any combination of such back-end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated from the described flows, and other components may be added to, or removed from, the described systems. Accordingly, other implementations are within the scope of this disclosure.

The invention claimed is:

1. A method of automatically identifying mineral content of a sample, the method comprising:
    generating a light microscopy image of the sample;
    identifying individual grains in the light microscopy image using a first clustering algorithm to identify grain boundaries on a per-pixel basis;
    identifying pore spaces in the sample based on output of a second clustering algorithm that analyzes the light microscopy image on a per-pixel basis, wherein the pore spaces are filled with a polymer material that includes epoxy material that has a uniform optical signal in the light microscopy image in comparison to optical signals from the individual grains identified in the light microscopy image, wherein identifying the individual grains in the light microscopy image using the first clustering algorithm is based, at least in part, on the identified pore spaces;
    classifying the identified individual grains in the light microscopy image using a third clustering algorithm; and
    mapping the classified individual grains to known mineral content.

2. The method of claim 1, wherein the light microscopy image includes a plurality of registered light microscopy images.

3. The method of claim 1, wherein classification of the identified individual grains by the third clustering algorithm includes classifying each grain based on aggregated statistics of a plurality of pixels corresponding to the grain.

4. The method of claim 3, wherein classifying each grain based on aggregated statistics of a plurality of pixels corresponding to the grain includes classifying each grain based on a distribution of pixel values corresponding to the grain.

5. The method of claim 3, wherein classifying each grain based on aggregated statistics of a plurality of pixels corresponding to the grain includes classifying each grain based on a distribution of filtered pixel values corresponding to the grain.

6. A system for automatically identifying mineral content of a sample, the system comprising:
    a processor; and
    a memory including executable instructions that when executed by the processor cause the processor to:
    receive a light microscopy image of the sample;
    identify individual grains in the light microscopy image using a first clustering algorithm to identify grain boundaries on a per-pixel basis;
    identify pore spaces in the sample based on output of a second clustering algorithm that analyzes the light microscopy image on a per-pixel basis, wherein the pore spaces are filled with a polymer material that includes epoxy material that has a uniform optical signal in the light microscopy image in comparison to optical signals from the individual grains identified in the light microscopy image, wherein identifying the individual grains in the light microscopy image using the first clustering algorithm is based, at least in part, on the identified pore spaces;
    classify the identified individual grains in the light microscopy image using a third clustering algorithm; and
    map the classified individual grains to known mineral content.

7. The system of claim 6, wherein the executable instructions that when executed by the processor further cause the processor to:
    identify pore spaces in the sample based on output of a third clustering algorithm that analyzes the light microscopy image on a per-pixel basis, and
    wherein identifying the individual grains in the light microscopy image using the first clustering algorithm is based, at least in part, on the identified pore spaces.

8. The system of claim 7, wherein the pore spaces are filled with a polymer material.

9. The system of claim 8, wherein the polymer material includes epoxy material that has a uniform optical signal in the light microscopy image in comparison to optical signals from the individual grains identified in the light microscopy image.

10. The system of claim 6, wherein the light microscopy image includes a plurality of registered light microscopy images.

11. The system of claim 6, wherein classification of the identified individual grains by the third clustering algorithm includes classifying each grain based on aggregated statistics of a plurality of pixels corresponding to the grain.

12. The system of claim 11, wherein classifying each grain based on aggregated statistics of a plurality of pixels corresponding to the grain includes classifying each grain based on a distribution of pixel values corresponding to the grain.

13. The system of claim 11, wherein classifying each grain based on aggregated statistics of a plurality of pixels corresponding to the grain includes classifying each grain based on a distribution of pixel values corresponding to the grain.

14. The system of claim 11, wherein classifying each grain based on aggregated statistics of a plurality of pixels corresponding to the grain includes classifying each grain based on a distribution of filtered pixel values corresponding to the grain.

* * * * *

UNITED STATES PATENT AND TRADEMARK OFFICE
CERTIFICATE OF CORRECTION

| | |
|---|---|
| PATENT NO. | : 12,469,104 B2 |
| APPLICATION NO. | : 17/755162 |
| DATED | : November 11, 2025 |
| INVENTOR(S) | : Andrew et al. |

It is certified that error appears in the above-identified patent and that said Letters Patent is hereby corrected as shown below:

On the Title Page

Column 2, item (57), under "ABSTRACT", Line 3, delete "sample generating," and insert -- sample, --, therefor.

On Page 2, Column 2, item (56), under "OTHER PUBLICATIONS", Line 1, delete "Netowrks:" and insert -- Networks: --, therefor.

On Page 2, Column 2, item (56), under "OTHER PUBLICATIONS", Line 6, delete "Irag"," and insert -- Iraq", --, therefor.

Signed and Sealed this
Twenty-third Day of December, 2025

John A. Squires
*Director of the United States Patent and Trademark Office*